United States Patent
Braillard et al.

(10) Patent No.: US 6,890,368 B2
(45) Date of Patent: May 10, 2005

(54) DRY SELF-LUBRICATING DENSE MATERIAL; A MECHANICAL PART FORMED FROM SAID MATERIAL; A METHOD OF MANUFACTURING SAID MATERIAL

(75) Inventors: Frédéric Braillard, Chatellerault (FR); Claude Mons, Savigny-le-Temple (FR); Philippe Perruchaut, Alfortville (FR); Didier Ribot, Dange Saint-Romain (FR); Joël Vigneau, Chamcueil (FR)

(73) Assignees: SNECMA Moteurs, Paris (FR); SNECMA Services, Paris (FR)

( * ) Notice: Subject to any disclaimer, the term of this patent is extended or adjusted under 35 U.S.C. 154(b) by 0 days.

(21) Appl. No.: 10/441,008

(22) Filed: May 20, 2003

(65) Prior Publication Data

US 2003/0231975 A1 Dec. 18, 2003

(30) Foreign Application Priority Data

Jun. 14, 2002 (FR) .............................. 02 07336

(51) Int. Cl.$^7$ .......................... B22F 3/12; C22C 19/00; C22C 33/00
(52) U.S. Cl. ..................... 75/231; 75/243; 75/244; 75/246; 419/13; 419/36; 419/38
(58) Field of Search ........................ 75/231, 243, 244, 75/246; 419/13, 36, 38

(56) References Cited

U.S. PATENT DOCUMENTS

| | | | | |
|---|---|---|---|---|
| 4,661,154 A | * | 4/1987 | Faure | 75/231 |
| 4,891,080 A | | 1/1990 | Del Corso et al. | |
| 4,927,461 A | * | 5/1990 | Ciloglu et al. | 75/254 |
| 5,298,052 A | * | 3/1994 | Tanaka et al. | 75/243 |
| 5,545,249 A | * | 8/1996 | Tanaka et al. | 75/246 |
| 5,997,805 A | | 12/1999 | Lawcock et al. | |
| 6,103,185 A | * | 8/2000 | Baazi et al. | 419/2 |
| 6,123,748 A | * | 9/2000 | Whitaker et al. | 75/252 |
| 6,126,894 A | | 10/2000 | Moxson | |
| 6,143,240 A | | 11/2000 | Jones et al. | |
| 6,572,671 B1 | * | 6/2003 | Baazi et al. | 75/244 |

FOREIGN PATENT DOCUMENTS

GB      2 284 430      6/1995

* cited by examiner

Primary Examiner—Ngoclan T. Mai
(74) Attorney, Agent, or Firm—Oblon, Spivak, McClelland, Maier & Neustadt, P.C.

(57) ABSTRACT

The present invention provides:
a material, which is dense, with a density of ≧90%, bulk dry self-lubricating, with a coefficient of friction of <0.3, constituted by a matrix that endows it with suitable strength, with a $R_m$ of ≧400 MPa in a medium to high temperature range of 300° C.≦θ≦600° C.; said matrix including particles of solid lubricant in its volume;
mechanical parts formed from said material;
a method of manufacturing said material.

19 Claims, 1 Drawing Sheet

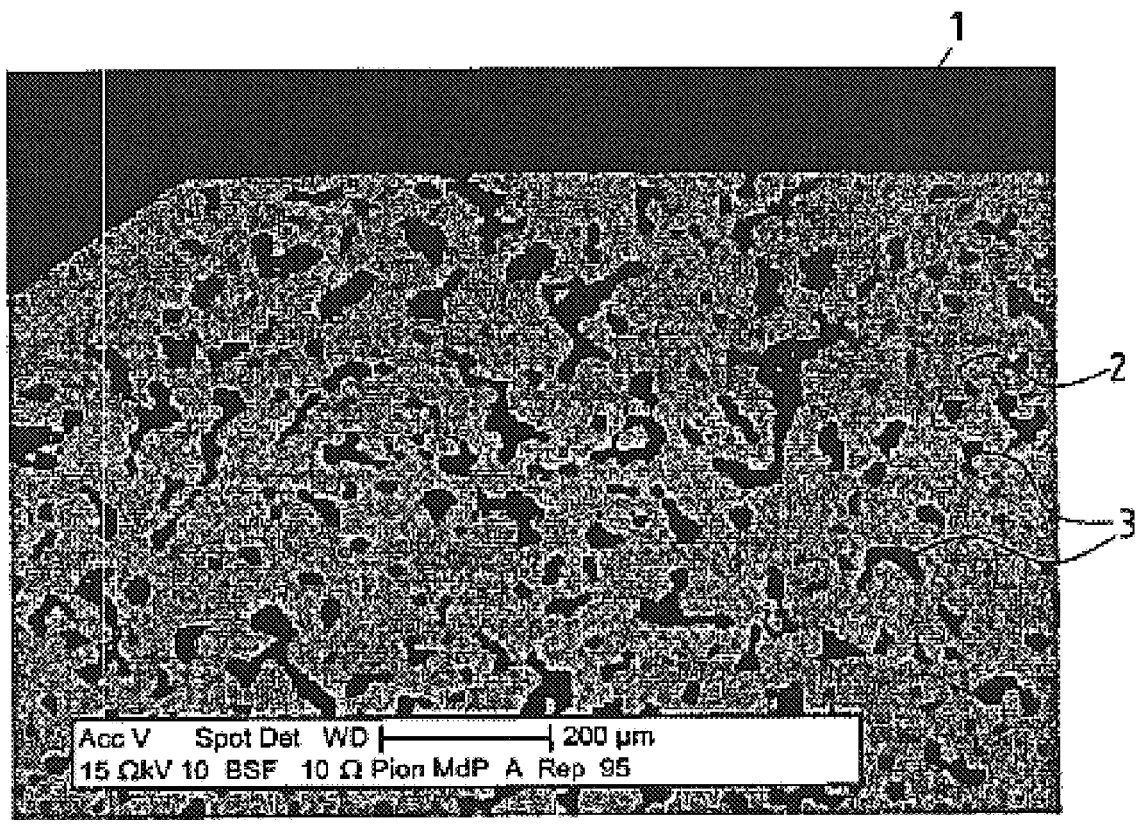

DRY SELF-LUBRICATING DENSE MATERIAL; A MECHANICAL PART FORMED FROM SAID MATERIAL; A METHOD OF MANUFACTURING SAID MATERIAL

The present invention relates to:

a novel dense, dry self-lubricating material, which has advantageous strength in the medium to high temperature range;

mechanical parts formed from said material;

a method of manufacturing said material.

BACKGROUND OF THE INVENTION

Many turbomachine functions must be carried out using friction products with a low coefficient of friction in zones in which conventional lubrication is impossible (conventional lubrication which combines porosity of the material in question and the use of an oil and/or grease). A substantial part of those functions is carried out by small mechanical parts with shapes of greater or lesser complexity (such as bushings in which spindles with variable pitch blades pivot), which parts are subjected to high temperatures and stresses.

Organic materials are used in the "low" temperature range (below 300° C.) and in the "high" temperature range (over 600° C.), metallic materials are used, primarily cobalt-based (if low coefficients of expansion are a secondary consideration), or ceramic materials are used. In the intermediate range, the medium to high temperature range, only carbons are used; their fragility substantially limits their use.

OBJECTS AND SUMMARY OF THE INVENTION

The present invention was developed in such a context and proposes small mechanical parts which are bulk self-lubricating, with good mechanical properties and with a low thermal expansion coefficient, which can function dry in a medium to high temperature range (300° C.$\leq \theta \leq$600° C.). Said mechanical parts are termed "small" as their three dimensions are of the order of a centimeter to a few centimeters at most. On considering this criterion, the skilled person will understand that the present invention fills a gap in the current technology, which furnishes methods of preparing equivalent mechanical parts but which are either smaller or larger.

Due to their constituent material (said material constituting the first aspect of the present invention), said mechanical parts (the second aspect of the present invention) provide a highly advantageous compromise between good strength in the hot and a low coefficient of friction, which can be maintained over time (since the self-lubricating surface layer is renewed during operation, the material being bulk self-lubricating). The surface of such a part includes sufficient lubricating elements, and the proportion of said lubricating elements is advantageously homogeneous through the volume of such a part.

The original material, semi-finished products, and products (mechanical parts as described above) formed from said material are advantageously obtained using powder metallurgy techniques. Their manufacturing method, developed by the inventors, constitutes the final aspect of the invention as claimed.

The novel material of the invention is a material that:

is dense: its density is 90% or more; i.e., its maximum residual porosity is 10%;

is bulk dry self-lubricating: it has a coefficient of friction of less than 0.3;

has good strength in the medium to high temperature range, 300° C. to 600° C.: $R_m \geq$ 400 MPa (said strength being defined conventionally, in a manner that is familiar to the skilled person, as its static breaking strength);

is constituted of a matrix that can provide it with the good strength indicated above, with particles of solid lubricant in its volume that endow said material with its dry lubricating properties. In an advantageous variant, said particles are uniformly distributed through said volume.

The residual porosity of the material, which results from its manufacturing method (see below), is low ($\leq$10%), or almost zero, since said material has to have good strength and no oil or grease reservoir effect is desirable.

Said material has a low thermal expansion coefficient, generally less than $12 \times 10^{-6}$, compatible with its use in the intermediate temperature range (300° C.$\leq \theta \leq$600° C.).

Clearly, the solid lubricant used (the invention does not exclude using at least two types of solid lubricant) is stable at the manufacturing and service temperatures of the material. It must remain intact, capable of exerting its lubricating action and in particular, it must not react with the matrix in which it is used. Advantageously, the solid lubricant consists of boron nitride or graphite.

It must also be present in a form that is compatible with the method of manufacturing the material. It can be pre-conditioned, pre-agglomerated, pre-alloyed, etc.

The solid lubricant particles in the material of the invention generally have an equivalent diameter (the particles can be spherical or angular) in the range 5 micrometers ($\mu$m) to 100 $\mu$m.

Said particles of solid lubricant are advantageously isolated from each other.

However, this does not exclude them being grouped together in small clumps. Clearly, said clumps must remain small in order to retain the homogeneity of the material. Said small clumps may have an equivalent diameter of at most 200 $\mu$m. The skilled person can readily appreciate the advantage in optimizing the implementation of the method of manufacturing the material of the invention, to minimize or avoid the formation of said clumps or agglomerates.

The solid lubricant particles are generally present in an amount in the range 1% to 30% by volume of the material in question. Clearly, they are present in the quantity ($\geq$1% by volume) required to obtain the anticipated effect (to provide the material with self-lubricating properties) but also not so much ($\leq$30%) that they drastically affect the mechanical properties of the material. A compromise between strength in the hot and a low coefficient of friction must be obtained.

Said solid lubricant particles are advantageously present in an amount of 10% to 20% by volume.

The matrix of the material of the invention advantageously consists of a steel or a metal super-alloy, more particularly:

a martensitic stainless steel (for example of the Z5CNU17 or 17-4PH type);

a cobalt-based alloy (for example of the KC20WN or KC25NW, HS25, HS31 type);

nickel (Ni) or a nickel-based alloy (for example of the NiCr, NK17CDAT (Astroloy) type).

As already indicated, said matrix guarantees the strength of the material.

The material of the invention advantageously consists of:
- a martensitic stainless steel (of the types described above, for example) containing boron nitride particles;
- a cobalt based alloy (for example of the types described above) containing particles of boron nitride and/or graphite (it is stated above that the use of a plurality of types of lubricant solid in the same matrix is not excluded);
- nickel or a nickel-based alloy (for example of the types described above) containing graphite particles.

The material of the invention can be obtained using powder metallurgy techniques. A method of manufacturing said material based on such techniques will be described below.

In a second aspect, the present invention provides metal parts of more or less complex shape formed from said novel material of the invention. It is possible (see below) to produce parts with a complex shape from said material.

The mechanical parts of the invention may be bushings, pivots, spindles, etc. More precisely, they may consist of bushings that can receive the spindles of variable pitch blades that function in a high pressure compressor (in a dry atmosphere, at high temperatures of about 400° C.).

In a third aspect, the present invention provides a method of manufacturing a novel dense, bulk self-lubricating material with good strength in the range 300° C. and 600° C.

Said method may be of the powdered metallic material injection molding (MIM) type. In all cases, the starting materials, constituting the matrix and the particles of solid lubricant, are present in powder form mixed with an organic binder.

Said method comprises:
- forming an intimate mixture of a powder which is a matrix precursor, particles of lubricant, and an organic binder;
- molding said intimate mixture by pressing or injecting into a mold;
- removing the molded blank from said mold;
- debinding said blank;
- densifying said debound blank by sintering.

The powders involved can have spherical or angular morphologies depending on their mode of manufacture, so that they facilitate shape retention and densification during the subsequent steps of the method. They may be pre-alloyed powders or otherwise. When graphite is used as a lubricant, it must be pre-agglomerated in order to be able to be mixed with the precursor powder of the matrix and the binder.

The powder used is the matrix precursor and provides the strength of the assembly. Its grains advantageously have an equivalent diameter in the range 20 $\mu$m to 70 $\mu$m. Advantageously, as indicated above, they are grains of steel, nickel, or a super-alloy based on nickel or cobalt.

The solid lubricant particles supply the lubricating properties. They are generally involved in the amounts indicated above (1% to 30% by volume of the total volume: powder+particles). In particular, said particles may comprise grains of boron nitride and/or grains of graphite coated with metal. They may comprise grains of boron nitride having an equivalent diameter in the range 5 $\mu$m to 30 $\mu$m and/or grains of coated graphite of equivalent diameter in the range 30 $\mu$m to 90 $\mu$m. The coating used must clearly be compatible with the matrix into which the grains of solid lubricant are to be incorporated.

The organic binder used is a conventional binder, for example of the type comprising wax+polymer (in particular polypropylene).

The intimate mixture of powder, particles and binder is advantageously produced as follows:
- said powder and particles (mixed together in advance, cold) and said binder are mixed at a temperature in the range 150° C. to 200° C. At this temperature, said binder must have a suitable viscosity;
- said mixture is cooled until it solidifies;
- said solidified mixture is ground.

The intimate mixture formed—advantageously obtained in the form of a ground material—is then molded into the desired shape. Pressing or injection into a suitable mold can be carried out to reproduce the desired shape, slightly oversized (to compensate for shrinkage during the subsequent densification steps). Said mold is advantageously jacketed, which enables the molded mixture to be heated or cooled in order to simplify filling said mold, setting the binder, and/or unmolding. This molding step produces the desired shape for the part. Such a part can be obtained directly (finished product), or a semi-finished product (which is subsequently machined) can be obtained, or the unfinished material can be obtained.

The molding operation is advantageously carried out by injection molding (more particularly metal injection molding), for example under the following conditions: at a temperature in the range 150° C. to 200° C., for 15 to 60 seconds.

This molding operation is conventionally followed by unmolding and debinding operations.

Debinding must clearly adapted to the nature of the binder employed. Advantageously, it is carried out in two steps. In this advantageous variant, it comprises, in succession:
- firstly a chemical treatment to extract the binder from the blank obtained on unmolding, to form a network of microchannels in its volume. A first chemical treatment can use hexane (a solvent for the binder) in the liquid phase then in the vapor phase;
- secondly a heat treatment which completes and finalizes the chemically-initiated debinding. Said heat treatment is generally carried out between 110° C. and 450° C. (advantageously with a slow rate of temperature rise) suitably protected using a gas (a reducing atmosphere: hydrogen, for example). Said heat treatment, which finalizes debinding, is advantageously carried out in order to pre-sinter the blank. Pre-sintering temperatures are generally in the range 500° C. to 1200° C. By carrying out such a pre-sintering, the blank is provided with structural integrity. The heat treatment can comprise a plurality of cycles and last 10 hours (h) to 50 h. In all cases, it is adapted to the nature of the material in question and to the thickness of the blank.

The final step consists of completely or partially densifying the debound blank. It has been observed that the final material can have a residual porosity of up to 10%. The sintering cycle is adapted to the material in question and is controlled by the heating and cooling rates, the constant temperature stages, and the threshold temperature. The sintering temperature range is generally from 1100° C. to 1500° C., more frequently 1100° C. to 1350° C. Said sintering is carried out in a vacuum or in a low partial pressure of a suitable protective gas (argon or hydrogen, for example).

The method described above can clearly be analyzed as a method by analogy. Completely surprisingly, it produces a novel material which performs well and combines substantial density with a self-lubricating nature in an advantageous temperature range.

As already indicated, said method can be finished off by machining the dense, self-lubricating structure obtained. It can also be finished off by at least one supplemental heat treatment intended to harden said structure. Said machining and supplemental heat treatment steps can be cumulative.

BRIEF DESCRIPTION OF THE DRAWING

A non-limiting illustration of different aspects of the invention (product, method) is provided below with reference to:

the accompanying FIGURE;

the example described below.

MORE DETAILED DESCRIPTION

Said FIGURE is a photograph of a section of a material of the invention with reference number 1 (the scale is shown on the photograph). Within the matrix (martensitic stainless steel), reference number 2, there is a homogeneous distribution of solid particles of lubricant (BN) with reference number 3. Said material was obtained as described in the example below.

EXAMPLE

In a first step, the following two metal powders were intimately mixed:

a Z5CNU17 powdered steel in an amount of 85% by volume, with a mean grain size of about 50 µm;

boron nitride particles in an amount of 15% by volume with a mean grain size of about 30 µm.

An organic binder constituted by wax and polypropylene was then added to said intimate mixture. The binder was used in an amount of 30% by volume (with 70% by volume of powder mixture). A second intimate mixture was generated. It was heated to 180° C. to produce a paste that was perfectly homogeneous.

It was then cooled, cut up and finally ground to generate a granulate.

The granulate obtained was introduced into an injection molding machine and heated to 180° C.

The heated mixture was injected into the cavity of a metal mold of suitable shape.

After 1 minute, said mold was opened and the molded part was removed.

Debinding was carried out in two steps. In a first step, hexane was used until almost all of the wax had been removed. In a second step, the polypropylene was pyrolyzed in a hydrogen atmosphere. The temperature was raised slowly then kept at 400° C. for 2 hours.

After this stage at 400° C., said temperature was slowly raised to 900° C. It was kept at this value for 10 minutes to presenter the unmolded part. The duration of this pre-sintering cycle was 32 hours.

Said pre-sintered part was cooled then heat treated again: at 1200° C., for 2 hours, for sintering (densification).

FIG. 1 clearly shows the boron nitride particles dispersed in the steel matrix (lighter). The equivalent diameter of said particles is 20 µm to 100 µm. Clearly, the initial 20 µm diameter particles have occasionally collected together to form small clumps.

What is claimed is:

1. A material, which is dense, with a density of ≧90%, bulk dry self-lubricating, with a coefficient of friction of <0.3, constituted by a matrix that endows it with suitable strength, with a $R_m$ of ≧400 MPa in a medium to high temperature range of 300° C.≦θ≦600° C.; said matrix including particles of solid lubricant in its volume.

2. The material according to claim 1, wherein the diameter of said particles of solid lubricant is in the range 5 µm to 100 µm.

3. The material according to claim 1, wherein said particles of solid lubricant are present in an amount of 1% to 30% by volume.

4. The material according to claim 1, selected from the group consisting of:

a martensitic stainless steel containing particles of boron nitride;

a cobalt-based alloy containing particles of boron nitride and/or graphite; and nickel or a nickel-based alloy containing particles of graphite.

5. The material according to claim 1, able to be obtained by powder metallurgy techniques.

6. A mechanical part selected from the group consisting of a bushing, a pivot, and a spindle, the part being formed from a material according to claim 1.

7. A method of manufacturing a material according to claim 1, the method comprising:

forming an intimate mixture of a powder which is the matrix precursor, particles of lubricant and an organic binder;

molding said intimate mixture by pressing or injecting into a mold;

removing the molded blank from said mold;

debinding said blank;

densifying said debound blank by sintering.

8. The method according to claim 7, wherein said powder, the matrix precursor, is constituted by grains with an equivalent diameter in the range 20 µm to 70 µm.

9. The method according to claim 7, wherein said particles of lubricant comprise grains of boron nitride with an equivalent diameter in the range 5 µm to 30 µm.

10. The method according to claim 7, wherein said particles of lubricant comprise grains of metal-coated graphite with an equivalent diameter in the range 30 µm to 90 µm.

11. The method according to claim 7, wherein said intimate mixture of powder, particles and binder is obtained in three steps:

mixing said powder, particles and said binder at a temperature in the range 150° C. to 200° C.;

cooling said mixture until it solidifies;

grinding said solidified mixture.

12. The method according to claim 7, wherein said molding is implemented by injection molding, advantageously at a temperature in the range 150° C. to 200° C., for 15 to 60 seconds.

13. The method according to claim 7, wherein said debinding comprises a first chemical treatment followed by a second heat treatment, said second heat treatment advantageously being continued to pre-sinter said blank.

14. The method according to claim 13, wherein said debinding includes a first chemical treatment using hexane in the liquid phase then in the vapor phase.

15. The method according to claim 14, wherein said debinding includes a second heat treatment carried out in a suitable protective gas, between 110° C. and 450° C.

16. The method according to claim 7, wherein densification by sintering is carried out in a vacuum or in a low partial pressure of a suitable protective gas, between 1100° C. and 1500° C.

17. The method according to claim 7, further comprising:

machining said densified debound blank.

18. The method according to claim 7, further comprising:

at least one supplemental heat treatment intended to harden said densified debound and optionally machined blank.

19. The material according to claim 1, wherein said particles of solid lubricant are present in an amount of 10% to 20% by volume.

* * * * *